US007655718B2

(12) United States Patent
Levitt et al.

(10) Patent No.: US 7,655,718 B2
(45) Date of Patent: Feb. 2, 2010

(54) POLYURETHANE COATING CURE ENHANCEMENT USING ZINC CARBONATE INITIATORS

(75) Inventors: Mark D. Levitt, Saint Paul, MN (US); Lauren K. Carlson, Saint Paul, MN (US); Minyu Li, Oakdale, MN (US); Robert D. P. Hei, Baldwin, WI (US)

(73) Assignee: Ecolab Inc., St. Paul, MN (US)

( * ) Notice: Subject to any disclaimer, the term of this patent is extended or adjusted under 35 U.S.C. 154(b) by 738 days.

(21) Appl. No.: 10/755,976

(22) Filed: Jan. 12, 2004

(65) Prior Publication Data
US 2005/0154111 A1    Jul. 14, 2005

(51) Int. Cl.
*B05D 3/02* (2006.01)
*C08K 3/00* (2006.01)
(52) U.S. Cl. ............... 524/424; 524/589; 427/372.2
(58) Field of Classification Search ........... 524/589, 524/424; 427/372.2, 407.1, 180
See application file for complete search history.

(56) References Cited

U.S. PATENT DOCUMENTS

| | | | |
|---|---|---|---|
| 3,347,804 A | 10/1967 | Buckley | |
| 4,223,098 A | 9/1980 | Treadwell | |
| 4,256,847 A | 3/1981 | Spector | |
| 4,256,848 A | 3/1981 | Brizgys et al. | |
| 4,278,578 A | 7/1981 | Carpenter | |
| 4,478,959 A | 10/1984 | Bechara et al. | |
| 4,517,330 A | 5/1985 | Zdanowski et al. | |
| 4,622,360 A | 11/1986 | Gomi et al. | |
| 4,885,324 A | 12/1989 | Hegedus et al. | |
| 4,891,248 A | 1/1990 | Kraus | |
| 5,011,902 A | 4/1991 | Foucht | |
| 5,156,915 A | 10/1992 | Wilson et al. | |
| 5,315,734 A | 5/1994 | Kresse et al. | |
| 5,319,018 A | 6/1994 | Owens et al. | |
| 5,390,390 A | 2/1995 | Kresse et al. | |
| 5,610,232 A | 3/1997 | Duan et al. | |
| 5,680,667 A | 10/1997 | Kresse et al. | |
| 5,887,311 A | 3/1999 | Kresse et al. | |
| 5,912,298 A | 6/1999 | Gomi et al. | |
| 5,965,686 A | 10/1999 | Blank et al. | |
| 5,998,035 A | 12/1999 | Iwamura et al. | |
| 6,009,297 A | 12/1999 | Maeda et al. | |
| 6,177,523 B1 * | 1/2001 | Reich et al. ............... | 525/459 |
| 6,316,535 B1 | 11/2001 | Caldwell et al. | |
| 6,544,942 B1 | 4/2003 | Smith et al. | |
| 6,583,101 B1 | 6/2003 | Wiseth et al. | |
| 6,727,334 B2 * | 4/2004 | Nishiwaki et al. ........... | 526/240 |
| 6,800,353 B1 * | 10/2004 | Anderson et al. ........... | 428/141 |
| 6,824,943 B2 * | 11/2004 | Gambayashi ............ | 430/108.6 |
| 6,830,860 B2 * | 12/2004 | Sacripante et al. ........ | 430/109.3 |
| 2002/0028621 A1 | 3/2002 | Levitt et al. | |
| 2002/0086743 A1 * | 7/2002 | Bulpett et al. ............... | 473/371 |
| 2002/0183455 A1 | 12/2002 | Gray et al. | |
| 2004/0096663 A1 * | 5/2004 | Yamaguchi et al. ......... | 428/403 |
| 2004/0109057 A1 * | 6/2004 | Pan et al. ..................... | 347/106 |
| 2004/0142266 A1 * | 7/2004 | Sacripante et al. ........ | 430/109.3 |
| 2004/0254282 A1 * | 12/2004 | Suzuki et al. ............... | 524/430 |
| 2005/0153068 A1 * | 7/2005 | Li et al. ..................... | 427/180 |
| 2005/0153140 A1 * | 7/2005 | Li et al. .................... | 428/423.1 |

FOREIGN PATENT DOCUMENTS

| | | |
|---|---|---|
| EP | 911 463 A2 | 4/1999 |
| EP | 0 830 402 B1 | 1/2000 |
| EP | 1433 827 A1 | 6/2004 |
| GB | 2216039 | 4/1989 |
| JP | 06-025593 | 2/1994 |
| WO | WO 92/20463 | 11/1992 |
| WO | WO 98/11168 | 3/1998 |

OTHER PUBLICATIONS

Owens, Joseph M., *It's What's on the Inside that Counts—The Chemistry of Floor Polishes*, Technology of Floor Maintenance and Current Trends, pp. 3-28 (2004).
No. AD200C1 polyester polyurethane formulation, Air Products and Chemicals, Inc. (Apr. 2001).
STAY-CLAD™ 5900 hydroxyl-functional acrylic polymer dispersion, Reichold, Inc. (Oct. 2001).
No. G-2029 acrylic polyurethane, Zeneca Resins, (dated "Jan. 3, 2000").
*Markets and Products,I & I Floorcare, Mixed-Metals Crosslinked Floor Care Polymers*, pp. 1-2, retrieved online on Sep. 11, 2033 from the Internet<URL: http://www.rohmhass.com/rhcis/markets_and_products/FloorCarePolymersMixedMetal.htm.
*Aqueous Two-Component Polyurethane (2K-PUR) Coatings: An Evolving Technology*, Martin Melchiors et al., pp. 1-10, retrieved online on Sep. 11, 2003 from the Internet:<URL: http://www.coatings.de/articles/ecspapers/melchiors/melchiors.htm.
*Anti-static coating solution for flat panel dispiay (display)*, Product Development Room, Advanced Materials Business Division, pp. 45-46, Technical Report 1999.
*Applications* retrieved online from the Nanophase Technologies Corporation Home Page on Dec. 11, 2003, from the Internet:<URL: http://www.nanophase.com/.
*ATO anti-static coating inks and coating film*, Display Materials Group, Advanced Materials Business Division, Shinichi Tanaka et al., pp. 32-34, Technical Report 2000.

(Continued)

*Primary Examiner*—James Seidleck
*Assistant Examiner*—Noah Frank
(74) *Attorney, Agent, or Firm*—Andrew D. Sorensen; Amy J. Hoffman

(57) ABSTRACT

Zinc carbonates such as carbonic acid zinc salt, zinc carbonate hydroxide monohydrate, zinc bicarbonate, zinc tetraamine carbonate, zinc ammonium carbonate, carbamic acid zinc salt and zinc carbamate can initiate hardening of polyurethane coatings and decrease the coating tack-free time. The decreased tack-free times facilitate earlier application of additional polyurethane layers and earlier return of a coated article to service, and can provide improved floor finishes.

8 Claims, No Drawings

OTHER PUBLICATIONS

*Floor Finish Products* page retrieved from the Jan. 8, 2003 Internet Archives entries stored at Internet:<URL: http://web.archive.org/web/20030118031312/http://www.chemcor.net/floor_finish.htm, pp. 1-3.

*Ultraviolet Hardening Type Antistatic Hard Coat Paint for Plastic*, Technical Documents, Advanced Materials Division, Sumitomo Osaka Cement Co., Ltd., retrieved online from the Sumitomo Osaka Cement Co., Ltd., Home Page on Dec. 11, 2003 from the Internet:<URL:http://www.socnb.com.

*Ultrafine Zinc Oxide (ZnO)*, Advanced Materials Division Sales Group, Sumitomo Osaka Cement Co., Ltd., (possibly dated "Jan. 2003").

* cited by examiner

POLYURETHANE COATING CURE ENHANCEMENT USING ZINC CARBONATE INITIATORS

TECHNICAL FIELD

This invention relates to hardenable polyurethane coatings, to methods for applying polyurethane coatings and to polyurethane coated articles.

BACKGROUND

Polyurethane coatings are widely used for applications in which a protective overcoat or film is desired. For example, two-component or so-called "2K" polyurethanes containing a polyol or polyamine first component and a polyisocyanate second component will react when mixed to form a durable film containing polyurethane or polyurea linkages. Unfortunately, 2K polyurethane coatings can have lengthy drying times. If uncatalyzed, the coating can take hours to become tack-free and days to harden completely. The hardening rate can be accelerated by adding a suitable catalyst or initiator. Although a variety of materials have been suggested for use as initiators, nowadays polyurethane coatings typically are hardened using an organometallic compound such as dibutyltin dilaurate, e.g. as in U.S. Pat. No. 6,316,535 B1.

U.S. Pat. Nos. 3,347,804 and 4,256,848 disclose that zinc salts when used alone are very poor catalysts for polyurethane reactions. These patents (and U.S. Pat. Nos. 4,223,098 and 5,011,902) describe mixed catalyst systems containing a zinc salt of $C_2$ and higher (e.g., $C_{2-20}$, $C_{2-21}$ or $C_{2-22}$) carboxylic acids together with one or more other metal compounds. U.S. Pat. No. 5,156,915 describes a mixed catalyst system for polyurethanes based on certain ionizable zinc halide salts and bismuth-containing organometallic catalysts. Other zinc-containing catalysts for polyurethanes include those described in U.S. Pat. No. 4,478,959.

U.S. Pat. Nos. 4,517,330 and 5,319,018 describe acid-functional polymers reacted with transition metal compounds including certain zinc compounds. U.S. Pat. No. 5,610,232 describes an adhesive containing a carboxylate functional polyurethane whose isocyanate groups are reacted with water to carry out chain extension. The resulting carboxylate functional prepolymer is crosslinked via its carboxylate groups using zinc ammonium carbonate. U.S. Pat. No. 5,912,298 describes waterborne acid-functional polyurethane resins crosslinked via their acid groups using calcium compounds, and in a comparison example using zinc ammonium carbonate.

SUMMARY OF THE INVENTION

Due to their relatively long tack-free times, multiple-component polyurethane coatings can be difficult to apply to flooring. Following application of the polyurethane coating, the floor cannot be put into service until the hardening process has advanced sufficiently so that the floor can withstand foot traffic. Sometimes it is necessary to apply more than one layer of polyurethane coating in order to obtain sufficient film thickness and durability. In such cases the polyurethane coating cannot be recoated until the hardening process has advanced sufficiently so that the floor can be walked upon to apply the second or subsequent layers. While hardening of the various layers takes place, the floor is out of service and the finish is susceptible to damage. Catalysts such as dibutyltin dilaurate can sometimes be employed to reduce coating tack-free times, but this may also undesirably increase cost owing to dibutyltin dilaurate's relatively high price.

We have found that certain zinc carbonates can be used by themselves to initiate rapid hardening of 2K polyurethanes. Zinc carbonates are available at relatively low cost and in easy to mix dispersions that can readily be added to the polyol or polyamine component of a 2K polyurethane. When added in an appropriate amount, zinc carbonates can substantially decrease the coating tack-free time without unduly shortening pot life. Zinc carbonates can also initiate cure of a 2K polyurethane coating when present in an adjacent non-polyurethane layer.

The present invention provides in one aspect an autohardenable polyurethane coating comprising sufficient zinc carbonate to decrease the coating tack-free time.

In another aspect the invention provides a method for applying a polyurethane coating comprising applying to a substrate a layer of an autohardenable polyurethane coating comprising sufficient zinc carbonate to decrease the coating tack-free time.

The invention also provides a jobsite-renewable floor finish kit comprising a substantially isocyanate-free undercoat, an autohardenable polyurethane topcoat and instructions for jobsite application of the undercoat to a floor and the topcoat to the undercoat, wherein the undercoat or topcoat contain sufficient zinc carbonate to decrease the topcoat tack-free time.

The invention provides in another aspect a method for applying a jobsite-renewable finish to a floor comprising applying to the floor a multilayer coating system comprising a layer or layers of a substantially isocyanate-free undercoat and a layer or layers of an autohardenable polyurethane topcoat, wherein the undercoat or topcoat contain sufficient zinc carbonate to decrease the topcoat tack-free time.

DETAILED DESCRIPTION

By using words of orientation such as "atop", "beneath", "on", "under", "uppermost", "lowermost", "between" and the like for the location of various layers in the disclosed multilayer coating system, we refer to the relative position of one or more layers with respect one another or where the context requires with respect to an underlying flooring substrate. We do not intend that the layers or flooring substrate must be horizontal, do not intend that the layers and flooring substrate must be contiguous or continuous, and do not exclude the presence of one or more intervening layers between layers or between the flooring substrate and a layer.

As used in connection with this disclosure, a "multilayer coating system" is a coating system that employs an undercoat and a topcoat of different compositions. In the interest of brevity, a layer or plurality of layers of the undercoat composition located between the flooring substrate and a topcoat may be referred to collectively as an "undercoat", a layer or plurality of layers of the topcoat composition located atop the flooring substrate and undercoat may be referred to collectively as the "topcoat", and a combination of a cured undercoat and topcoat (or a topcoat alone) located atop a flooring substrate may be referred to as a "coating" or "finish".

As used in connection with this disclosure, a "film-former" is a monomer, oligomer or polymer that can be applied (if need be, with a suitable plasticizer or coalescing solvent) and dried, crosslinked or otherwise hardened to form a tack-free substantially durable film.

As used in connection with this disclosure, a "hardening system" is a chemical or physical process (including solvent evaporation or other drying processes, photochemical reactions, electrochemical reactions, radical processes, ionic processes, moisture cure processes and multiple-component (e.g., two or three component) crosslinking processes) through which an undercoat or topcoat composition becomes dried, crosslinked or otherwise cured to form a tack-free substantially durable film.

As used in connection with this disclosure, an "initiator" is an agent that can cause undercoat or topcoat hardening or accelerate the rate at which undercoat or topcoat hardening occurs. We include among initiators materials such as catalysts (including energy activated catalysts, photocatalysts or photoinitiators and thermal catalysts), Lewis and Brönsted acids and bases, radical sources, metal compounds and the like.

As used in connection with this disclosure, an "autohardenable" polyurethane is a coating that contains a polyol or polyamine and a polyisocyanate, and which begins hardening upon being mixed or dispensed and without requiring an external energy source such as UV or visible light illumination or elevated heating to harden to at least a tack-free state when in a thin film form. We include among autohardenable polyurethanes those having multi-part (e.g., two-part) formulations with two or more separately packaged polyurethane precursors (typically a polyol or polyamine first component and a polyisocyanate second component) that will harden shortly after the precursors are mixed and applied to a flooring substrate. We also include among autohardenable polyurethanes those whose precursors are packaged in a single container having one or more septa or other suitable dividers that can prevent the precursors from mixing until desired by a user. We also include among autohardenable polyurethanes those containing an encapsulated ingredient that will cause hardening of the polyurethane when the precursors are mixed, dispensed or otherwise processed in a way that causes the microcapsules to rupture.

As used in connection with this disclosure, "pot life" is the time period after an autohardenable polyurethane is dispensed from its container (and if need be, its precursors mixed, dispensed or otherwise processed to initiate hardening) during which the dispensed material can successfully be applied to a flooring substrate to form a thin, visibly smooth, self-leveling, cured film whose properties are generally similar to those exhibited by the polyurethane if applied immediately after being dispensed.

As used in connection with this disclosure, a polyurethane is regarded as being "stripper-permeable" if when coated atop a desired flooring substrate (and optional intervening undercoat) and subjected to the action of a suitable chemical stripper, the stripper permeates or otherwise penetrates the polyurethane sufficiently so that the polyurethane (and undercoat, if present) can be removed from the floor. Stripper permeability can sometimes be enhanced by mechanically roughening, puncturing or abrading the polyurethane (using, for example, a nonwoven floor scrub pad, brush or other mild abrasive measure) just prior to stripping. A polyurethane will be regarded as being stripper-permeable even if such mechanical roughening is necessary for stripping, so long as such mechanical roughening does not unduly damage the underlying floor.

As used in connection with this disclosure, a hardened coating is regarded as being "jobsite-renewable" if, at such time as it may be desired to do so, the coating can be removed from an underlying flooring substrate without removing substantial portions of the flooring substrate, using simple, minimally abrasive measures such as a methylene chloride-free or acetone-free chemical stripper and a mop and detergent solution, mildly abrasive but flooring-safe measures such as a nonwoven floor scrub pad, or other measures such as peeling (and without requiring aggressive removal techniques such as grinding, sanding, sandblasting or a stripper based on methylene chloride or acetone), and then replaced with the same or a substantially similar finish and hardened to provide a visibly smooth tack-free substantially durable film.

As used in connection with this disclosure, an "oligomer" is a polymerizable (e.g., crosslinkable) moiety containing a plurality (e.g., 2 to about 30) of monomer units.

As used in connection with this disclosure, the term "zinc carbonate" refers to salts containing $zinc^{+2}$ ions and theoretically containing carbonate, bicarbonate, carbamic or carbamate counterions, viz., zinc salts of the radicals $CO_3^{-2}$, $HCO_3^{-1}$, $NHCO_2^{-1}$ or $NH_2CO_2^{-1}$. The term zinc carbonate also refers to the hydrated forms of such salts. Representative zinc carbonates include $ZnCO_3$ (carbonic acid zinc salt), $ZnCO_3.2Zn(OH)_2.H_2O$ (zinc carbonate hydroxide monohydrate), $Zn(HCO_3)_2$ (zinc bicarbonate), zinc tetraamine carbonate (CAS no. 38714-47-5), zinc ammonium carbonate (CAS No. 40861-29-8), $Zn(NHCO_2)_2$ (carbamic acid zinc salt) and $Zn(NH_2CO_2)_2$ (zinc carbamate).

The disclosed autohardenable polyurethane coatings are hardened in whole or in part using a zinc carbonate. The chosen zinc carbonate may be employed in several forms including finely-divided particles, solutions or dispersions. Waterborne zinc carbonate solutions or dispersions are especially preferred for use with waterborne polyurethane coating components. Zinc tetraamine carbonate and zinc ammonium carbonate are particularly preferred zinc carbonates.

Sufficient zinc carbonate should be employed in the polyurethane coating (or in an adjacent layer of a substantially isocyanate-free coating) so that the polyurethane tack-free time decreases. Preferably the tack-free time decreases by at least about 10%, more preferably by at least about 30% and most preferably by at least about 50% compared to a polyurethane coating prepared without any zinc carbonate or other initiator in the coating (or in an adjacent coating) and evaluated using the cotton ball Tack-free Evaluation method described below. However, if present in the polyurethane, the zinc carbonate concentration preferably is sufficiently low so that the polyurethane has a pot life of at least about 20 minutes, more preferably at least about 30 minutes, and yet more preferably at least about 1 to about 2 hours. As a general numeric guide, when zinc carbonate is added to the topcoat, the topcoat preferably contains about 0.001 to about 1 wt. % zinc expressed as zinc oxide, more preferably about 0.01 to about 0.1 wt. % zinc, based on the total topcoat weight. When used in an adjacent substantially isocyanate-free coating (e.g., an undercoat in the case of a multilayer floor finish composition), the adjacent layer preferably contains about 0.5 to about 20 wt. % zinc carbonate, more preferably about 0.7 to about 10 wt. %, and most preferably about 0.7 to about 3 wt. % based on the equivalent weight as zinc oxide compared to the total undercoat weight. The zinc carbonate may also be applied by itself underneath a topcoat, and used to initiate topcoat cure even though not initially part of an adjacent layer containing a film former. Preferably the polyurethane and zinc carbonate are combined using stirring or other methods that will be apparent to those skilled in the art. If employed in a 2K polyurethane, the zinc carbonate preferably is added to the polyol or polyamine precursor rather than to the polyisocyanate precursor to prevent premature reaction. The addition can take place well prior to or at a job site.

A variety of polyurethane precursors can be employed in the invention. The precursors as mixed or dispensed may be solvent-borne, waterborne or 100% solids, and may represent a multipart (e.g., a two component or 2K) composition or a latent one part composition containing a blocked isocyanate and if need be a suitably encapsulated zinc carbonate. The polyurethane precursors preferably are water-soluble or water-dispersible. Water solubility or water dispersibility can be facilitated in a variety of ways that will be familiar to those skilled in the art, including incorporating appropriate functional groups in the polyurethane precursors, converting one or more of the polyurethane precursors to their salt forms, or adding a suitable cosolvent or surfactant. Preferred polyurethane formulations include those employing a (i) polyol such as a polyester polyol, polyether polyol, acrylic polyol or combination thereof and (ii) a polyisocyanate such as an aliphatic or aromatic isocyanate oligomer. Two component waterborne polyurethane formulations are especially preferred. As a general guide, the water concentration preferably is from about 15 to about 85 wt. % based on the polyurethane weight. More preferably, the polyurethane contains about 25 to about 75 wt. % water, and most preferably about 35 to about 70 wt. % water. The polyurethane may also contain a suitable diluent, solvent, plasticizer or cosolvent, at a concentration which may vary depending in part on the other polyurethane ingredients and on the intended application and application conditions. As a general guide, the diluent, solvent, plasticizer or cosolvent concentration preferably is from 0.1 to about 10 wt. % based on the polyurethane solution weight, and more preferably about 1 to about 7 wt. %.

Representative waterborne polyurethanes are described in U.S. Pat. Nos. 6,316,535 B1 and 6,544,942 B1 and in U.S. Patent Application Publication No. U.S. 2002/0028621 A1. Suitable commercially or experimentally available two-part waterborne polyurethanes include those from suppliers including Air Products and Chemicals, Inc. (e.g., No. AD200C1 polyester polyurethane formulation), Bayer AG (e.g., No. MG98-040 polyester polyurethane formulation), Reichhold, Inc. (e.g., No. STAY-CLAD™ 5900 hydroxyl-functional acrylic polymer dispersion and No. 3955-24W acrylic polyurethane formulation), U.S. Polymers, Inc. (e.g., Nos. 979-1 and 980-3 polyester polyurethane formulations) and Zeneca Resins (e.g., No. G-2029 acrylic polyurethane formulation).

The polyurethane can contain a variety of adjuvants to alter its performance or properties before or after application to a floor. Useful adjuvants include hardening retarders (which function as pot life extenders), inorganic particles, organic (e.g., polymeric) particles, flatting agents, surfactants, surface slip modifiers, defoamers, waxes, indicators, UV absorbers, light stabilizers, antioxidants, plasticizers, coalescents and adhesion promoters. The types and amounts of such adjuvants will be apparent to those skilled in the art. The polyurethane may if desired be a pigmented coating or paint. The polyurethane can also contain a lightening agent (described further in application Ser. No. 10/756,120 entitled FLOOR FINISH WITH LIGHTENING AGENT, filed even date herewith, the disclosure of which is incorporated herein by reference).

The polyurethane may contain inorganic or organic particles (or both inorganic and organic particles) to enhance its abrasion resistance, scratch resistance, wear resistance or strippability. Preferred inorganic particles are described in copending U.S. patent application Ser. No. 09/657,420 filed Sep. 8, 2000 and entitled SCRATCH-RESISTANT STRIPPABLE FINISH, the disclosure of which is incorporated herein by reference. Representative inorganic particles include silicas such as fumed silicas, stabilized silica sols, silica organosols, silicon dioxide particles, colloidal silicas and spherical silicas; aluminas such as aluminum oxide particles and alumina modified colloidal silica; and glasses such as glass beads and glass microbubbles. Representative organic particles include EXPANCEL™ spherical plastic microspheres, commercially available from Akzo Nobel N.V., HYDROPEL™ QB organic particles and NON-SKID™ modified polypropylene waxes, both commercially available from Shamrock Technologies, Inc. Although the inorganic or organic particles may if desired be obtained in dry powder form, preferably they are employed in aqueous or solvent-based dispersions, as such dispersions are much more easily combined with the polyurethane. In general, solvent-based particle dispersions can easily be combined with waterborne polyurethanes and generally can provide good gloss and good film integrity in the cured coating. However, solvent-based particle dispersions tend to be more expensive than aqueous particle dispersions. When waterborne particle dispersions are combined with waterborne polyurethanes, the resulting coating may have somewhat lower gloss and film integrity. We prefer in such circumstances to combine a waterborne particle dispersion with a suitable dispersing solvent (e.g., alcohols such as methanol, ethanol or isopropyl alcohol) that will dissolve in or be miscible with both water and the polyurethane, and that will help to disperse the particles in the polyurethane. The resulting mixture of waterborne particles and dispersing solvent can be combined with the polyurethane and mixed using a suitable mixing device such as a sonic mixer.

Suitable inorganic and organic particles are available in a wide variety of average particle diameters. Small diameter particles tend to provide better adhesion of the polyurethane to an undercoat layer (if present), but also tend to be more expensive than large diameter particles. Large particles may provide better surface scratch resistance. Preferably, the average particle diameter is about 3 to about 10,000 nanometers, more preferably about 12 to about 7,500 nanometers. In some cases, use of a bimodal mixture of small and large diameter particles can provide a cured finish having an optimal balance of good coating properties, scratch resistance and durability. The polyurethane preferably contains sufficient inorganic or organic (or both inorganic and organic) particles to provide increased scratch resistance compared to a polyurethane that does not contain such particles. If desired, large amounts of inorganic or organic particles can be employed, so long as the other properties of the polyurethane are not unduly harmed by the thickening effect or loss of gloss caused by the particle addition. However, particle additions in relatively small amounts may provide a significant improvement in scratch resistance. Preferably, the polyurethane contains about 1 to about 50 wt. % inorganic or organic particles based on the weight of polymerizable solids in the polyurethane. More preferably, the polyurethane contains about 1 to about 25 wt. % inorganic or organic particles, and most preferably about 1 to about 10 wt. % inorganic or organic particles.

A variety of undercoat compositions can be employed in multilayer polyurethane compositions applied to flooring substrates. Preferred undercoats are film-formers that will adhere to the floor, provide an adherent surface for the polyurethane, and be removable using stripping or peeling. Most preferably the undercoat will be strippable using a chemical stripper that is capable of permeating, dissolving, swelling or otherwise softening the polyurethane sufficiently so that the agent can act upon the undercoat. Thus the choice of undercoat may be determined in part by the chosen polyurethane and stripper. The undercoat desirably should be more strippable than the polyurethane. The undercoat can be solvent-borne, waterborne or 100% solids, and can employ a variety of hardening systems. Water-soluble or water dispersible (as is or with a dispersing agent) acid-containing polymers crosslinked using transition metals (e.g., zinc crosslinked acrylics), alkaline earth metals, alkali metals or mixture thereof are a particularly preferred class of undercoats and a particularly preferred hardening system. These polymers preferably can be stripped using a variety of strippers that dissolve the undercoat or attack its crosslinking site. In some instances as supplied these polymers have been reacted with zinc carbonate, and may liberate zinc carbonate during cure in sufficient quantities to initiate or at least accelerate hardening of the polyurethane. Other film-forming materials such as zinc-free acrylic finishes (e.g., acrylic copolymers), water-based (e.g., waterborne) latex emulsions, polyvinyl acetate copolymers (e.g., polyvinyl acetate-polyethylene copolymers), polyvinyl alcohol and its copolymers, polyvinylpyrrolidone and its copolymers, modified cellulose, sulfonated polystyrenes and a variety of other materials that will be familiar to those skilled in the art (e.g., film forming water-soluble or water-dispersible polymers other than those already mentioned) can also be employed as undercoats. Preferred undercoat compositions are also described in application Ser. No. 10/756,119 entitled JOBSITE-RENEWABLE MULTILAYER FLOOR FINISH WITH ENHANCED HARDENING RATE, filed even date herewith, the disclosure of which is incorporated herein by reference. The undercoat can if desired be applied in several layers containing different materials in each layer. The individual layers need not be homogeneous. For example, the zinc carbonate may if desired "bloom" to the surface of the hardened undercoat.

The undercoat may if desired contain other initiators for the polyurethane hardening system in place of or in addition to the zinc carbonate. For brevity zinc carbonate and other such initiators can be collectively referred to as "topcoat initiators". Preferably the topcoat initiator is not an initiator for the undercoat hardening system. Exemplary topcoat initiators include tin compounds such as dibutyl tin dilaurate, stannous octoate and FASCAT™ 4224 dibutyltin bis(1-thioglycerol) catalyst (commercially available from ATO-FINA Chemicals, Inc.); zirconium compounds; amines; and zinc compounds such as zinc crosslinked acrylic dispersions (described further in application Ser. No. 10/755,972 entitled AQUEOUS POLYURETHANE COATING SYSTEM CONTAINING ZINC CROSSLINKED ACRYLIC DISPERSION, filed even date herewith, the disclosure of which is incorporated herein by reference) and ultrafine zinc oxide (described further in application Ser. No. 10/755,975 entitled POLYURETHANE COATING CURE ENHANCEMENT USING ULTRAFINE ZINC OXIDE, filed even date herewith, the disclosure of which is incorporated herein by reference).

The undercoat preferably contains water or another suitable diluent, plasticizer or coalescent, including compounds such as benzyloxyethanol; an ether or hydroxyether such as ethylene glycol phenyl ether (commercially available as "DOWANOL EPh" from Dow Chemical Co.) or propylene glycol phenyl ether (commercially available as "DOWANOL PPh" from Dow Chemical Co.); dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products available under the trade designations DBE, DBE-3, DBE-4, DBE-5, DBE-6, DBE-9, DBE-IB, and DBE-ME from DuPont Nylon); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate; and mixtures thereof. Cosolvents can also be added if desired to assist in formulating and applying the undercoat. Suitable cosolvents include Butoxyethyl PROPASOL™, Butyl CARBITOL™ acetate, Butyl CARBITOL™, Butyl CELLOSOLVE™ acetate, Butyl CELLOSOLVE™, Butyl DIPROPASOL™, Butyl PROPASOL™, CARBITOL™ PM-600, CARBITOL™ Low Gravity, CELLOSOLVE™ acetate, CELLOSOLVE™, Ester EEP™, FILMER IBT™, Hexyl CARBITOL™, Hexyl CELLOSOLVE™, Methyl CARBITOL™, Methyl CELLOSOLVE™ acetate, Methyl CELLOSOLVE™, Methyl DIPROPASOL™, Methyl PROPASOL™ acetate, Methyl PROPASOL™, Propyl CARBITOL™, Propyl CELLOSOLVE™, Propyl DIPROPASOL™ and Propyl PROPASOL™, all of which are available from Union Carbide Corp.; and mixtures thereof. The concentration may vary depending in part on the other undercoat ingredients and on the intended application and application conditions. As a general guide, when water alone is used as a diluent, the water concentration preferably is from about 15 to about 98 wt. % based on the undercoat solution weight. More preferably, the undercoat contains about 25 to about 95 wt. % water, and most preferably about 60 to about 95 wt. % water. If a diluent, plasticizer, coalescent or cosolvent other than water is included in the undercoat solution, then its concentration preferably is from about 0.1 to about 10 wt. % based on the weight of polymerizable solids in the undercoat, and more preferably about 1 to about 7 wt. %.

The undercoat can contain a variety of adjuvants to alter its performance or properties before or after application to a floor. Useful adjuvants include those mentioned above in connection with the polyurethane.

Often it will be convenient to prepare the undercoat by adding zinc carbonate to a commercially available one part floor finish material such as PADLOCK™, GEMSTAR LASER™ and TAJ MAHAL™ acrylic floor finishes and COURTMASTER II™ urethane floor finish from Ecolab Inc.; CORNERSTONE™ and TOPLINE™ acrylic floor finishes from 3M; HIGH NOON™ acrylic finish from Butchers; CITATION™ acrylic finish from Buckeye International, Inc., COMPLETE™, SIGNATURE™, TECHNIQUE™ and VECTRA™ acrylic floor finishes from SC Johnson Professional Products; SPLENDOR™, DECADE 90™, PRIME SHINE™ ULTRA and PREMIER™ acrylic finishes and FIRST ROUND and FORTRESS™ urethane acrylic finishes from Minuteman, International, Inc.; FLOORSTAR™ Premium 25 floor finish from ServiceMaster, Inc.; UPPER LIMITS™ acrylic finish from Spartan Chemical Co.; and materials such as those described in U.S. Pat. Nos. 4,517,330 and 5,319,018 and the patents cited therein. Strippable floor coatings designated as "sealers" (e.g., OVER AND UNDER™ floor sealer from S. C. Johnson Professional Products and ACRYL-KOTE™ Seal and Finish and PREP Floor Seal from Minuteman, International, Inc.), strippable coatings based on polyvinylacetates and blends of any of the foregoing may also be employed as undercoats. Polymer emulsions such as DURAPLUS™ 3 zinc crosslinked acrylic dispersion, used as an ingredient in some floor finishes and commercially available from Rohm & Haas Co., and ROSHIELD™ 3120 UV curable acrylate coating from Rohm & Haas (taken alone or blended with styrene maleic anhydride polymer as described in PCT Published Patent Application No. 98/11168) may also be employed as undercoats. If desired, two or more layers of different undercoats can be employed in order to optimize properties such as adhesion to the floor or to the topcoat, wear resistance, strippability, etc.

The polyurethane coatings can be applied to a variety of substrates, including wood, plastics, metals, concrete, wallboard and other mechanical or architectural substrates. The disclosed coatings are particularly well-suited for application to flooring substrates due to their shortened tack-free times. This permits an applicator to walk on the flooring substrate relatively soon after coating application in order to apply additional layers of the composition or to return the floor to service. Representative flooring substrates include resilient substrates such as sheet goods (e.g., vinyl flooring, linoleum or rubber sheeting), vinyl composite tiles, rubber tiles, cork and synthetic sports floors, and non-resilient substrates such as concrete, stone, marble, wood, ceramic tile, grout and Terrazzo. The coating can be jobsite-applied to a flooring substrate after the substrate has been installed (e.g., to monolithic flooring substrates such as sheet vinyl goods, linoleum, cork, rubber sheeting, synthetic sports floors, concrete, stone, marble, grout or Terrazzo, or to multipiece flooring substrates such as vinyl composite tiles, wood floorboards or ceramic tiles), or can be factory-applied to a flooring substrate before it is installed (e.g., to monolithic flooring substrates such as sheet vinyl goods in roll form, or multipiece flooring substrates such as vinyl composite tiles or wood floorboards). Jobsite application is especially preferred, with suitable jobsites including indoor and outdoor sites involving new or existing residential, commercial and government- or agency-owned facilities.

The polyurethane coatings can be applied using a variety of methods, including spraying, brushing, flat or string mopping, roll coating and flood coating. Mop application, especially flat mopping, is preferred for coating most floors. Suitable mops include those described in U.S. Pat. Nos. 5,315,734, 5,390,390, 5,680,667 and 5,887,311. Typically, the floor should first be cleaned and any loose debris removed. One or more undercoat layers or coats (diluted if necessary with water or another suitable diluent or cosolvent) may be applied to the floor. One to three undercoat layers typically will be preferred. When multiple undercoat layers are employed they can be the same or different. Each undercoat layer preferably will have a dry coating thickness of about 2.5 to about 25 µm, more preferably about 2.5 to about 15 µm. Preferably the overall undercoat dry coating thickness will be about 5 to about 100 µm, and more preferably about 5 to about 50 µm.

After the undercoat has hardened sufficiently so that its visual and physical properties have developed and it is safe to apply a polyurethane layer (or if no undercoat is employed, after the cleaned floor has dried), the polyurethane can be applied. The degree of undercoat hardening that will be deemed sufficient for such polyurethane application and the associated waiting period will usually vary depending on factors such as the undercoat and polyurethane formulations, undercoat coating thickness, ambient conditions and polyurethane coating method, and typically may involve a wait of about 15 minutes to about one hour before polyurethane application. Full hardening of the undercoat may not be needed before the polyurethane can safely be applied. In many instances safe application of the polyurethane will be possible once it is possible to walk on the undercoat without marring it.

One or more (e.g., one to three) polyurethane layers may be applied to the floor or to the undercoat layers. The polyurethane layers preferably are applied before the polyurethane pot life elapses. The presence of an initiator for the polyurethane in the undercoat appears primarily to affect the tack-free time for the first polyurethane layer. If the first polyurethane layer is allowed to harden sufficiently so that it can be walked upon, then the tack-free time for subsequent polyurethane layers may not be greatly influenced by the presence of the initiator in the undercoat. However, if such subsequent polyurethane layers are applied before the first polyurethane layer reaches a walk-on state then some reduction in tack-free time may be observed in the subsequent layers, but to a lesser extent than for the first polyurethane layer. The undercoat may be formulated with a view to promoting the efficacy of the initiator in reducing polyurethane tack-free times. The polyurethane usually is formulated with a view to attaining high durability, a factor that may reduce the efficacy of the initiator with respect to such subsequent polyurethane layers. Each polyurethane layer preferably will have a dry coating thickness of about 2.5 to about 200 µm, more preferably about 2.5 to about 100 µm. Preferably the overall polyurethane dry coating thickness will be relatively thin in order to reduce raw material costs, e.g., about 5 to about 150 µm, and more preferably about 5 to about 40 µm. Multilayer finishes preferably will have an overall dry coating thickness of about 10 to about 500 µm, and more preferably about 10 to about 80 µm.

The floor can be placed into service (or returned to service) once the finish has hardened sufficiently to support normal traffic without marring. Inclusion of the zinc carbonate in the 2K polyurethane topcoat (or if used, in the undercoat) promotes faster topcoat cure and enables the floor to be subjected to normal traffic much earlier than if the initiator is not employed.

The finish can receive normal maintenance until such time as it is desired to remove and renew it. Removal can be carried out, for example, by cleaning the floor (using e.g., a brush or mop) followed by application of a stripper. The chosen stripper may depend in part on the chosen undercoat and polyurethane. Preferred strippers include compositions containing phenyl alcohols (e.g., benzyl alcohol); alkoxy ethers (e.g., glycol ethers such as propylene glycol methyl ether and ETHYL CARBITOL™, BUTYL CARBITOL™ and BUTYL CELLOSOLVE™ solvents from Union Carbide Corp.); alkoxy esters; aryloxy alcohols (e.g., phenoxy ethanol and phenoxy propanol); dibasic esters; N-alkyl pyrrolidones, ketones, esters, metasilicates; amines (e.g., ethanolamine); alkanolamines (e.g., monoethanolamine); acid based agents and caustic agents (e.g., sodium or potassium hydroxide). Strippers containing phenyl alcohols are especially preferred for stripping multilayer finishes employing polyurethane topcoats owing to the relatively high rate at which phenyl alcohols may penetrate such topcoats and their ease of use and low odor. A particularly preferred stripper concentrate contains a polar solvent that is denser than water and a sufficiently low level of cosolvent or surfactant so that upon mixing with water a pseudo-stable aqueous dispersion forms which will phase-separate following application to a surface. Concentrates of this type are described in U.S. Pat. No. 6,544,942. Another preferred stripper concentrate contains about 1 to 75 wt. percent of an ether alcohol solvent having a solubility in water of less than about 5 wt. % of the solvent, and about 1 to 75 wt. % of an ether alcohol solvent/coupler having a solubility in water of about 20 to about 100 wt. % of the solvent/coupler, wherein the vapor pressure of the concentrate is less than 1 millimeter Hg. Concentrates of this type are described in U.S. Pat. No. 6,583,101. The stripper can contain a variety of adjuvants to alter the performance or properties of the stripper before or after application to a cured polyurethane finish. Useful adjuvants include abrasive particles, surfactants, defoamers, indicators, slip reducing agents, colorants and disinfectants. The types and amounts of such adjuvants will be apparent to those skilled in the art.

The stripper should be allowed to stand for a suitable time (e.g., for a minute or more, preferably for two hours or less, and most preferably for between about 5 minutes and about 1 hour) while it softens the finish. After the finish softens sufficiently it can be removed using a variety of techniques including scrubbing, vacuuming, mopping, use of a squeegee, scraping, sweeping, wiping, mild abrasion or other measures that do not remove substantial portions of the floor. Removal will usually be made easier if water or a suitable detergent solution is applied to the softened finish. The floor can be allowed to dry and new layers of the undercoat and polyurethane applied to renew the finish.

Multilayer finishes typically will be sold in the form of a kit including the undercoat and polyurethane in suitable containers or dispensers together with suitable instructions for mixing or dispensing any undercoat and polyurethane components as needed and for applying the undercoat atop a floor and applying the polyurethane atop the undercoat. If desired, the undercoat or polyurethane could be packaged as concentrates intended to be mixed with water or another suitable solvent prior to application. Optionally the kit may include a stripper concentrate in a suitable container. The stripper concentrate typically will be mixed with water or another suitable carrier at, for example, about 5-30 % by weight active ingredients prior to application. The kit can also contain additional undercoat materials (e.g., leveling coatings) that can be applied to the floor before application of the undercoat and polyurethane, or various additional materials (e.g., maintenance coats or wax finishes) that can be applied atop the polyurethane. Maintenance coats typically will be applied when the initially-applied multilayer coating exhibits noticeable wear or loss of gloss, and typically will be applied at solids levels that are the same as or somewhat less than the solids levels of the initially-applied polyurethane.

If desired, the multilayer floor finishes can also be factory-applied to a variety of flooring substrates. For example, when factory-applied to a multipiece flooring material, the pieces typically will be coated on at least the top surface and optionally coated or partially coated on the side or bottom surfaces.

The invention is further illustrated in the following non-limiting examples, in which all parts and percentages are by weight (wt.) unless otherwise indicated.

Tile Preparation

Industrial black and white 305 mm×305 mm vinyl composition tiles (commercially available from the Congoleum Corporation) were used in all examples. Before use, the tile surfaces were cleaned and roughened until no longer shiny, by rubbing with MAGICSCRUB™ mild abrasive cleaner (commercially available from Ecolab Inc.) using a non-woven SCOTCH-BRITE™ green abrasive scrub pad (commercially available from 3M Company). The cleaned tiles were rinsed with tap water and dried at room temperature. This removed all factory applied coatings and surface soil, and provided a consistently reproducible surface.

Undercoat Formulations and Coating Method

PADLOCK™ metal crosslinked acrylic polymer-based floor finish (commercially available from Ecolab Inc. and identified below as Undercoat No. 1) and PREMIUM 25™ acrylic polymer-based floor finish (commercially available from Aramark Corporation and identified below as Undercoat No. 2) were both employed as undercoats. The tiles were coated by applying a weighted undercoat amount in two layers to the cleaned tile surface using commercially available microfiber pads, at a wet coating rate of about 48 $m^2$/liter.

The first and subsequent undercoat layers were allowed to air dry for at least 15 minutes before applying any further undercoat layers.

Topcoat Formulations and Coating Method

Two-component polyurethane topcoat formulations based on a commercially available polyester polyol resin (BAYHYDROL™ XP-7093, 30% nonvolatiles, Bayer Corporation), and commercially available hexamethylene diisocyanates (DESMODUR™ N-3600 or BAYHYDUR™ XP-7165, both from Bayer Corporation) were prepared as follows. The polyester polyol precursor (designated as Part A in Table 1) was made by mixing the polyol, surfactants and water as set out below. Part A was combined with the isocyanate precursor (designated Part as B in Table 1) according to the weight ratios given in Table 1. The topcoat precursors were mixed vigorously for three minutes, then allowed to sit for 10 to 12 minutes before applying a pre-weighed amount of the topcoat atop the air-dried undercoat using a flocked pad, at a wet coating rate of about 16-18.4 $m^2$/liter. The topcoated tiles were allowed to dry at room temperature. The dried tiles had a tack-free, glossy finish made from a polyacrylate-based undercoat and a polyurethane-based topcoat.

TABLE 1

|  |  | Topcoats | |
|---|---|---|---|
|  | Ingredient | Top coat No. 1 Parts by weight | Top coat No. 2 Parts by weight |
| Part A | Polyester polyol[1] | 88.90 | 54.95 |
|  | Silicone defoamer[2] | 0.13 | 0.08 |
|  | Surface agent[3] | 0.06 | 0.04 |
|  | Surface agent[4] | 1.16 | 0.77 |
|  | Deionized water | 9.75 | 10.09 |
| Part B | Hexamethylene diisocyanate[5] | 39.78 |  |
|  | Hydrophilic hexamethylene diisocyanate[6] | 100 | 23.38 |
| Mix Ratios |  |  |  |
|  | Part A | 22.5 | 22.15 |
|  | Part B | 7.5 | 7.85 |

[1]BAYHYDROL ™ XP-7093, 30% nonvolatiles, Bayer Corporation.
[2]BYK ™ 025, BYK Chemie.
[3]BYK ™ 348, BYK Chemie.
[4]BYK ™ 380, BYK Chemie.
[5]DESMODUR ™ N-3600, Bayer Corporation.
[6]BAYHYDUR ™ XP-7165, Bayer Corporation.

Film Evaluation

The coated tiles were evaluated to assess tack-free time, solution pot life, gloss and removability, as follows:

Tack-free Evaluation

A small (7.6 mm×7.6 mm) cotton square was placed on the coating surface and covered with a 2 kg weight for 30 seconds. The weight was removed and the cotton lightly brushed or rubbed away using a finger. Any substantially noticeable amount of fibers remaining on the topcoat indicated the topcoat was still tacky and that the tack-free time had not been reached. Coating surfaces that exhibited a shorter tack-free time tended to cure or harden more quickly overall than coatings with longer tack-free times Polyurethane Pot Life Evaluation Polyurethane pot lives were determined by observing the elapsed time between the start of mixing and the first visual appearance of a precipitate or gel in the polyurethane. The longer it took for precipitation to occur or for a gel to appear, the better the pot life.

Gloss

Film gloss was measured at 60° and 20° using a Micro-TRI-Gloss meter (commercially available from Paul N. Gardner Co., Inc.). An average of 10 readings was reported. The standard deviation for individual samples was less than 3%.

Strippability

Chemical-physical removability (strippability) was evaluated by affixing an adhesive-backed foam ring to the polyurethane surface. The inner portion of each ring was filled with a 13 wt. % aqueous solution of the stripper shown below in Table 2. The resulting aqueous stripper solution was allowed to contact the coating surface for 10 minutes and then poured out of the ring. The coating surface was rinsed with tap water. The treated area was viewed in relation to the untreated area by peeling the foam ring away from the coating and briefly wiping with a paper towel to remove loose finish. A visually determined percent coating removal was recorded, with higher removal values indicating more removable coatings and a 100 % value indicating complete removal.

TABLE 2

| Stripper | |
| --- | --- |
| Ingredient | Parts |
| Benzyl Alcohol[1] | 57.03 |
| Monoethanolamine, 99%[2] | 22.81 |
| Diethylene glycol monobutyl ether[3] | 5.703 |
| Dipropylene glycol n-butyl ether[4] | 5.703 |
| Propylene glycol phenyl ether[5] | 5.703 |
| Surface active agent[6] | 1.901 |
| Wetting agent[7] | 0.115 |
| Deionized water | 1.035 |
| TOTAL | 100 |

[1] Benzyl alcohol, technical grade, Velsicol Chemical.
[2] Monoethanolamine, 99%, Dow Chemical.
[3] Diethylene glycol monobutyl ether, 99%, Equistar.
[4] Dipropylene glycol n-butyl ether, 98.5%, Dow Chemical.
[5] Propylene glycol phenyl ether, Dow Chemical.
[6] Linear Alcohol (C12-15) ethoxylate 9 EO, Rhodia.
[7] ZONYL ™ FSJ, 40% active, Dupont.

EXAMPLE 1

Two layers of Undercoat No. 1 or Undercoat No. 2 were applied to vinyl composition tiles cleaned as described above. The undercoats were allowed to dry for one hour prior to application of Topcoat No. 1 or Topcoat No. 2. In Run Nos. 1-1 and 1-2 no initiator was added to the polyurethane. In Run No. 1-3, the initiator dibutyl tin dilaurate (METACURE™ T-12, commercially available from Air Products and Chemicals Inc. and identified below as "MT-12") was added to Part A of Topcoat No. 2. Part A was then combined with Part B and mixed vigorously for 3 minutes, after which it was allowed to stand for 12 to 25 minutes. In Run Nos. 1-4 through 1-8, the initiator zinc tetraamine carbonate (15% zinc (as ZnO), CAS 38714-47-5, low pH version containing about 12-16% ammonia, commercially available from ChemCor and identified by the manufacturer as "zinc ammonium carbonate" and identified below as "ZTC") was added in varying amounts to Part B of Topcoat No. 1 or Topcoat No. 2. Part A was then combined with Part B and mixed vigorously for 3 minutes, after which it was allowed to stand for 12 to 25 minutes before coating it atop the undercoated tiles. The polyurethane tack-free times and pot life times were determined as described above. The initiator concentration is shown below in Table 3. For zinc tetraamine carbonate, the reported concentration is equivalent to the percentage of zinc present as ZnO in the polyurethane topcoat. For the MT-12 catalyst, the reported concentration is equivalent to the percentage of dibutyl tin dilaurate in the polyurethane topcoat.

TABLE 3

| | | | | | Results | |
| --- | --- | --- | --- | --- | --- | --- |
| | | | Topcoat | | Tack-free Time | Topcoat Pot Life |
| Run No. | Initiator | Undercoat Identity | Identity | Initiator Conc., % | (hours: min) | (hours: min) |
| 1-1 | None | No. 1 | No. 1 | 0 | >5:00 | >1:30 |
| 1-2 | None | No. 2 | No. 2 | 0 | >9:00 | 2:25 |
| 1-3 | MT-12 | No. 2 | No. 2 | 0.08 | 5:00 | ~2:15 |
| 1-4 | ZTC | No. 1 | No. 1 | 0.05 | ~4:00 | 2:00 |
| 1-5 | ZTC | No. 1 | No. 1 | 0.1 | 2:00 to 3:00 | 0:25 |
| 1-6 | ZTC | No. 1 | No. 1 | 0.2 | NA[1] | <0:01 |
| 1-7 | ZTC | No. 2 | No. 2 | 0.005 | 4:30 to 5:00 | 0:50 |
| 1-8 | ZTC | No. 2 | No. 2 | 0.08 | 3:30 | 0:30 |

[1] Not Applicable.

The results in Table 3 demonstrate that adding the non-organo-metallic initiator zinc tetraamine carbonate to Topcoat No. 1 could substantially reduce polyurethane tack-free time without reducing pot life (compare Run Nos. 1-1 and 1-4). At higher zinc levels pot life was shortened (compare Run Nos. 1-1, 1-5 and 1-6), indicating that for this formulation an initiator concentration below about 0.2% was preferred. A zinc tetraamine carbonate addition also reduced the tack-free time of Topcoat No. 2 (compare Run Nos. 1-2, 1-7 and 1-8). The pot life was also shortened but was at least 30 minutes, a time sufficient for typical floor applications.

EXAMPLE 2

Using the method of Example 1, varying amounts of zinc tetraamine carbonate or dibutyltin dilaurate were added to Undercoat No. 1 or Undercoat No. 2. Two layers of the thus-modified undercoat formulations were applied to cleaned tiles at a wet coating rate of about 50 m²/liter using a microfiber pad. The first layer was allowed to dry for about 30 to 45 minutes before application of the second undercoat layer. The completed undercoat was allowed to dry in air for several hours prior to application of Topcoat No. 1 or Topcoat No. 2. In Run No. 2-7, the zinc tetraamine carbonate was added only to the second undercoat layer. The results are shown below in Table 4.

TABLE 4

| Run No. | Initiator | Layers Undercoat Identity | Topcoat Identity | Initiator Conc., % | Initiator Location in Undercoat layers | Results Tack-free Time (hours) |
|---|---|---|---|---|---|---|
| 2-1 | None | 1 | 1 | 0 | None | 7 |
| 2-2 | ZTC | 1 | 1 | 0.71 | Both | 5 |
| 2-3 | ZTC | 1 | 1 | 1.63 | Both | 4 |
| 2-4 | None | 2 | 2 | 0 | None | >9 |
| 2-5 | MT-12 | 2 | 2 | 10.7 | Both | 9 |
| 2-6 | ZTC | 2 | 2 | 2.34 | Both | 5-6 |
| 2-7 | ZTC | 2 | 2 | 2.34 | Uppermost undercoat layer only | 6 |

The results in Table 4 demonstrate that adding the non-organo-metallic initiator zinc tetraamine carbonate to Undercoat No. 1 or Undercoat No. 2 could substantially reduce the polyurethane tack-free time (compare Run Nos. 2-1 through 2-3, 2-4 and 2-6 through 2-7). The initiator shortened the tack-free time even though it was not initially present in the polyurethane (see Run Nos. 2-2, 2-3, 2-6 and 2-7). Addition of 10.7% dibutyl tin dilaurate to Undercoat No. 2 did not reduce the polyurethane tack-free time.

EXAMPLE 3

Using the general method of Example 1 but with overnight drying of the second layer of Undercoat No. 1 before application of the first layer of Topcoat No. 1, zinc ammonium carbonate was added in varying amounts to Undercoat No. 1 and used to initiate more rapid hardening of Topcoat No. 1. The polyurethane tack-free times are shown below in Table 5.

TABLE 5

| Run No. | Initiator | Under coat | Initiator Conc. In Undercoat, % | Top coat | Tack-free time (hours:min) |
|---|---|---|---|---|---|
| 3-1 | None | No. 1 | 0.0 | No. 1 | 7:00 |
| 3-2 | ZTC | No. 1 | 0.1 | No. 1 | 7:30 |
| 3-3 | ZTC | No. 1 | 0.75 | No. 1 | 5:00 |
| 3-4 | ZTC | No. 1 | 1.6 | No. 1 | 4:00 |

The results in Table 5 demonstrate that adding zinc tetraamine carbonate initiator to the undercoat could substantially reduce the polyurethane tack-free time (compare Run No. 3-1 to Run Nos. 3-3 and 3-4). In this instance a 0.1% addition (Run No. 3-2) did not reduce the tack-free time, but larger amounts were effective for doing so.

EXAMPLE 4

Using the general method of Example 1, zinc tetraamine carbonate was added to the undercoat, polyurethane or both the undercoat and polyurethane. The results are set out below in Table 6.

TABLE 6

| Run No. | Initiator | Undercoat Identity | Undercoat Conc., % | Topcoat Identity | Topcoat Initiator Conc., % | Results Tack-free Time (hours:min) | Pot Life (hours:min) |
|---|---|---|---|---|---|---|---|
| 4-1 | none | No. 2 | 0 | No. 2 | 0 | >9 | ~2:25 |
| 4-2 | ZTC | No. 2 | 0.74 | No. 2 | 0 | 8:00 to 9:00 | ~2:25 |
| 4-3 | ZTC | No. 2 | 0 | No. 2 | 0.5 | 4:30 to 5:00 | 0:50 |
| 4-4 | ZTC | No. 2 | 0.74 | No. 2 | 0.5 | 4:00 to 4:30 | 0:50 |

The results in Table 6 demonstrate that adding zinc tetraamine carbonate initiator to both the undercoat and polyurethane provided the largest reduction in polyurethane tack-free time.

EXAMPLE 5

The extent to which several of the multilayer coating compositions could be chemically stripped was evaluated using the above-described Strippability test. The results are shown below in Table 7:

TABLE 7

| Run No. | Initiator | Undercoat Identity | Undercoat Initiator Conc., % | Topcoat Identity | Topcoat Initiator Conc., % | Results Tack-free Time (hours) | % Removal |
|---|---|---|---|---|---|---|---|
| 5-1 | None | No. 1 | 0 | No. 1 | 0 | 7 | 100 |
| 5-2 | ZTC | No. 1 | 1.63 | No. 1 | 0 | 4 | 100 |
| 5-3 | None | No. 2 | 0 | No. 2 | 0 | 7 | 100 |
| 5-4 | ZTC | No. 2 | 2.34 | No. 2 | 0 | 5-6 | 100 |

The results in Table 7 demonstrate that addition of a polyurethane initiator to the undercoat provided substantial reductions in polyurethane tack-free time (compare Run No. 5-1 to Run No. 5-2 and Run No. 5-3 to Run No. 5-4) without adversely affecting strippability.

Various modifications and alterations of this invention will be apparent to those skilled in the art without departing from the scope and spirit of this invention. It should be understood that this invention is not limited to the illustrative embodiments set forth above.

We claim:

1. An autohardenable polyurethane coating comprising sufficient zinc carbonate to catalyze polymerization and to decrease the coating tack-free time, wherein the zinc carbonate comprises zinc tetraamine carbonate or zinc ammonium carbonate.

2. A coating according to claim 1 containing sufficient zinc carbonate to decrease the coating tack-free time by at least about 10%.

3. A coating according to claim 1 containing sufficient zinc carbonate to decrease the coating tack-free time by at least about 30%.

4. A coating according to claim 1 containing sufficient zinc carbonate to decrease the coating tack-free time by at least about 50%.

5. A coating according to claim 1 containing about 0.001 to about 1 wt. % zinc expressed as zinc oxide.

6. A coating according to claim 1 containing about 0.01 to about 0.1 wt. % zinc expressed as zinc oxide.

7. A coating according to claim 1 wherein the coating comprises a two part composition wherein part one is comprised of polyisocyanate and part two is comprised of a polyester polyol, polyether polyol, acrylic polyol, polyurethane polyol or combination thereof.

8. A coating according to claim 1 wherein the polyurethane comprises a waterborne multicomponent polyurethane.

* * * * *

UNITED STATES PATENT AND TRADEMARK OFFICE
CERTIFICATE OF CORRECTION

| | |
|---|---|
| PATENT NO. | : 7,655,718 B2 |
| APPLICATION NO. | : 10/755976 |
| DATED | : February 2, 2010 |
| INVENTOR(S) | : Levitt et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1408 days.

Signed and Sealed this

Twenty-third Day of November, 2010

David J. Kappos
*Director of the United States Patent and Trademark Office*